(No Model.)

S. H. SAVINE.
FIRE POT FOR BLACKSMITHS.

No. 266,724. Patented Oct. 31, 1882.

WITNESSES:

INVENTOR.

UNITED STATES PATENT OFFICE.

SAMUEL H. SAVINE, OF FORT WAYNE, INDIANA.

FIRE-POT FOR BLACKSMITHS.

SPECIFICATION forming part of Letters Patent No. 266,724, dated October 31, 1882.

Application filed May 9, 1882. (No model.)

*To all whom it may concern:*

Be it known that I, SAMUEL H. SAVINE, of Fort Wayne, in the county of Allen and State of Indiana, have invented certain new and useful Improvements in Fire-Pots for Blacksmiths; and I do hereby declare that the following is a full, clear, and exact description of the invention, which will enable others skilled in the art to which it appertains to make and use the same, reference being had to the accompanying drawings, which form a part of this specification.

This invention relates to fire-pots for blacksmiths' and others' use, and has for its object to provide a simple, durable, inexpensive, and efficient device.

Figure 1:
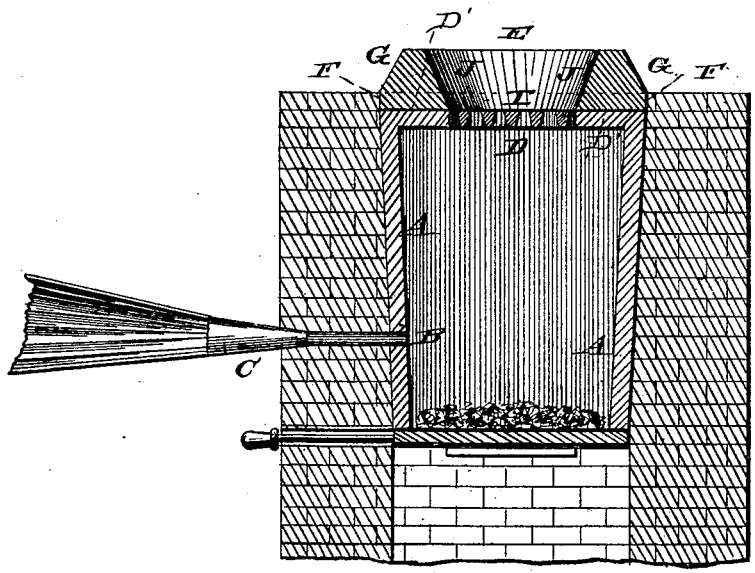
Figure 2:
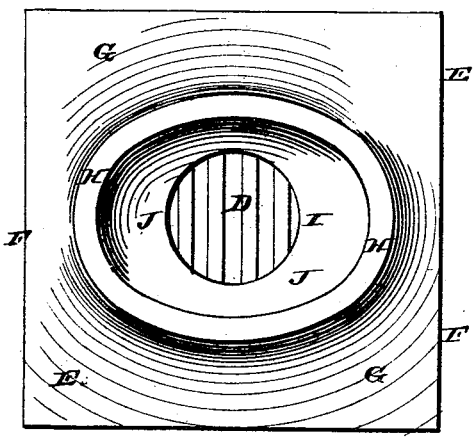
Figure 3:
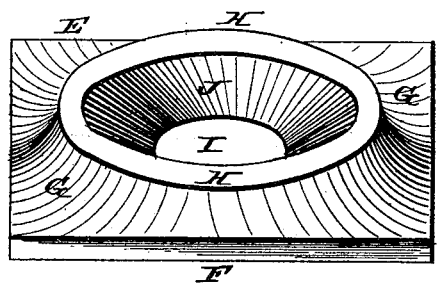

In the drawings, Figure 1 is a vertical sectional view of a blast-furnace having a tuyere-plate provided with my improved fire-pot. Fig. 2 is a top view of the plate and pot, and Fig. 3 is a perspective detail view of the latter.

Referring by letter to the drawings, A designates the ordinary tuyere plate or iron, having an opening, B, for the bellows-nozzle C, and a grate, D, at its horizontal supporting plate or top D', which may be circular, rectangular, elliptical, or any other desired shape.

E is the metallic fire-pot, which is formed preferably of cast-iron, and may be either segmental or solid. The pot E has a flat bottom, F, of a shape adapted to evenly fit the top of the tuyere-plate, and its sides G converge upwardly to a horizontal annular rest or platform, H, inside which is formed an opening, I, the sides of which, J, are beveled down to and conform to the shape of the grate D. This opening constitutes the receptacle for the fuel, and the convergent sides of the same prevent the latter from spreading. By reference to the drawings it will be seen that the walls of the fire-pot are somewhat Λ-shaped in cross-section, thus being thickest where most necessary, and effecting a saving in the material of which it is constructed.

It will be observed that the interior beveled wall, J, inclines down to a point projecting around the fixed grate in the covering top plate, D', so that a deep receptacle is provided. The fire-pot also rests neatly on plate D', and the exterior brick-work is built up around the straight edge F to fasten the pot from lateral displacement; but the pot may be readily lifted up from off its flat bed D'.

The functions and advantages of my invention will be readily understood. It is simple, inexpensive, efficient, and of superior convenience and durability.

I am aware of Patents No. 116,264, to J. Cappon, and No. 47,760, to J. R. Hobbs, the former of which shows a fire-pot resting on the edge of the tuyere above a dumping-grate, which latter enters up into the pot. The patent to Hobbs shows a two-part fire-pot held in place by vertical pins. I claim no part of these inventions, my claim being limited to my own novel construction and arrangement of parts.

I claim and desire to secure by Letters Patent—

The combination, in a blacksmith's forge, of the tuyere having a horizontal supporting top plate forming a cover, and provided with a grate the removable fire-pot having a flat bottom which rests on the horizontal top bed-plate of the tuyere, and provided with a beveled interior extending entirely down to the grate, and the brick-work built up around the edge of the fire-pot to prevent lateral displacement thereof, as set forth.

In testimony that I claim the foregoing as my own I have hereto affixed my signature in presence of two witnesses.

S. H. SAVINE.

Witnesses:
D. L. HARDING,
P. J. MÜNCH.